United States Patent [19]

Crosby

[11] 4,147,484

[45] Apr. 3, 1979

[54] PLASTIC SHEET STAMPING APPARATUS

[75] Inventor: Clyde Crosby, Gainesville, Ga.

[73] Assignee: Gladwin, Inc., Oakwood, Ga.

[21] Appl. No.: 806,341

[22] Filed: Jun. 14, 1977

[51] Int. Cl.² .............................................. B29D 7/02

[52] U.S. Cl. .................................... 425/142; 425/223; 425/307; 425/317

[58] Field of Search ............... 264/145, 148, 151, 157, 264/160, 294, 296, 320, 146, 67; 425/304, 307, 385, 142, 223, 317; 101/27

[56] References Cited

U.S. PATENT DOCUMENTS

| | | | |
|---|---|---|---|
| 2,784,763 | 3/1957 | Shorts | 425/307 X |
| 3,329,995 | 7/1967 | O'Brien et al. | 425/142 |
| 3,659,993 | 5/1972 | Brown, Jr. | 425/317 X |
| 3,891,373 | 6/1975 | Necoby | 425/307 X |

*Primary Examiner*—Robert L. Spicer, Jr.
*Attorney, Agent, or Firm*—James L. Bean

[57] ABSTRACT

A continuous, moving length of substantially rigid thermoplastic synthetic resin material is marked with a hot die at spaced intervals along its length. The hot die is mounted for movement parallel to the direction of movement of the sheet from the sheet forming apparatus, and is actuated in coordination with a sheet cutter which cuts the continuous length into individual sheets so that a die mark is provided at the desired position on each sheet cut from the continuous length.

9 Claims, 5 Drawing Figures

PLASTIC SHEET STAMPING APPARATUS

BACKGROUND OF THE INVENTION

1. Field of the Invention

This invention relates to the forming and marking of sheets of plastic material, and more particularly to an improved method of and apparatus for marking a continuous moving sheet of substantially rigid thermoplastic synthetic resin material at spaced intervals along its length whereby individual sheets of material cut from the continuous length are each marked at a predetermined position.

2. Description of the Prior Art

It is conventional practice to form thermoplastic synthetic resin materials such as, for example, polystyrene, acrylic, polycarbonate, and ABS, hereinafter generally referred to as plastic, into sheets of predetermined size by initially extruding, casting, or otherwise forming a continuous sheet of the material into the desired thickness and width. The term "sheets" as used herein generally refers to substantially rigid or self-sustaining sheets and may have a thickness of from about 1/32 inch to ½ inch or greater. As the continuous sheet is conveyed from the forming apparatus and the plastic material hardens sufficiently to be substantially self-sustaining, it is cut into individual sheets of the desired size. The continuous sheet can have a width which is substantially greater than the width of the individual sheets cut therefrom, with the continuous sheet being side-trimmed and slit into a plurality of separate continuous lengths which move to the cutting apparatus in edge-to-edge, coplanar relation. For simplicity of description, the term "extrusion" will hereinafter sometimes be employed to include various forming methods and apparatus.

A movable hot knife unit is conventionally used on an extrusion line to cut the continuous lengths of plastic sheet into the desired lengths. The hot knife unit reciprocates along the line of movement of the continuous sheet and is coordinated with the sheet movement so that it is moving in the same direction and at the same speed as the sheet during the cutting operation, thereby avoiding sheet deformation during the time that the hot knife is in contact with the sheet.

It is often desired or necessary to permanently mark plastic sheets for identification as to material, thickness, manufacturer, safety specifications and the like. This is particularly true when the plastic sheets are to be used in architectural applications or as safety shields, where such markings may be required on each sheet. In the past, it has been the conventional practice to apply such markings adjacent one edge the individual sheet with a hot stamp die. This marking, or branding, has conventionally been a separate operation performed after the plastic sheets are cut to size. Such a separate marking operation has necessarily increased the overall cost of the sheet, due to the necessity for additional handling, and the extra operation has resulted in an increase in damaged and rejected sheets.

SUMMARY OF THE INVENTION

In accordance with the present invention, individual sheets of plastic are die-marked by an automatically operated hot die marking apparatus mounted between the extrusion apparatus and the hot knife. The marking apparatus is supported for movement with the hot knife and includes actuating means for moving a hot die into contact with the surface of the sheet substantially simultaneously with the actuation of the hot knife. This assures against relative movement between the hot die and the plastic sheet, in the plane of the sheet, during the marking operation to thereby produce a clearly legible die mark while requiring minimal penetration of the die into the surface of the sheet. The stamping apparatus is adjustable, along the length of the moving sheet, relative to the position of the hot knife to enable the accurate positioning of the die stamp mark relative to the edges of the individual sheets subsequently cut from the continuous length. The stamping apparatus also includes roller supports for supporting the continuous length of material moving past the marking heads, with the rollers being adjustable longitudinally of the sheet and relative to the marking head to provide necessary support to prevent excess sagging of the moving sheet between the extruding apparatus and the hot knife cutter.

BRIEF DESCRIPTION OF THE DRAWINGS

The foregoing and other features and advantages of the invention will become apparent from the detailed description contained hereinbelow, taken in conjunction with the drawings, in which.

DESCRIPTION OF THE PREFERRED EMBODIMENT

Figure 1:
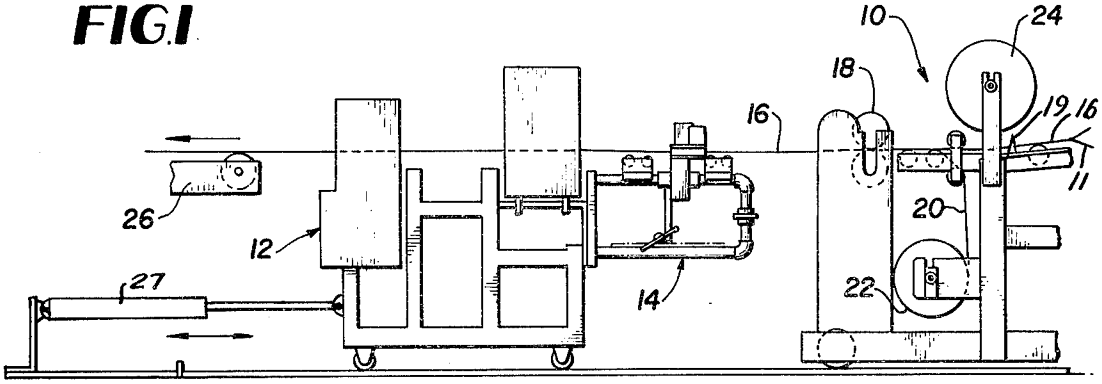
FIG. 1 is a side elevation view of the sheet marking apparatus mounted on a movable sheet cutter, and showing a portion of the sheet extrusion apparatus.
Figure 3:
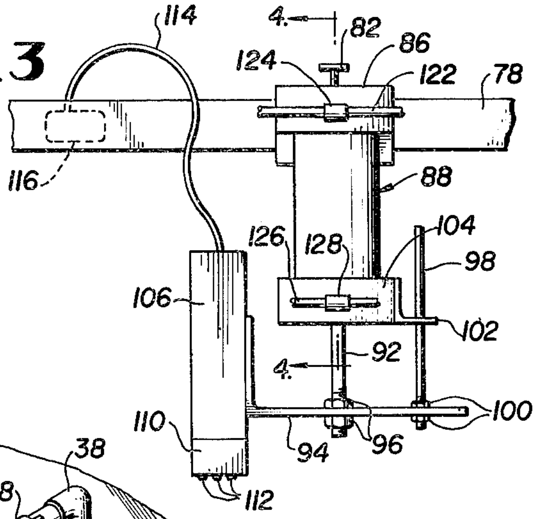
FIG. 3 is a fragmentary end elevation view showing one stamping head.
Figure 2:
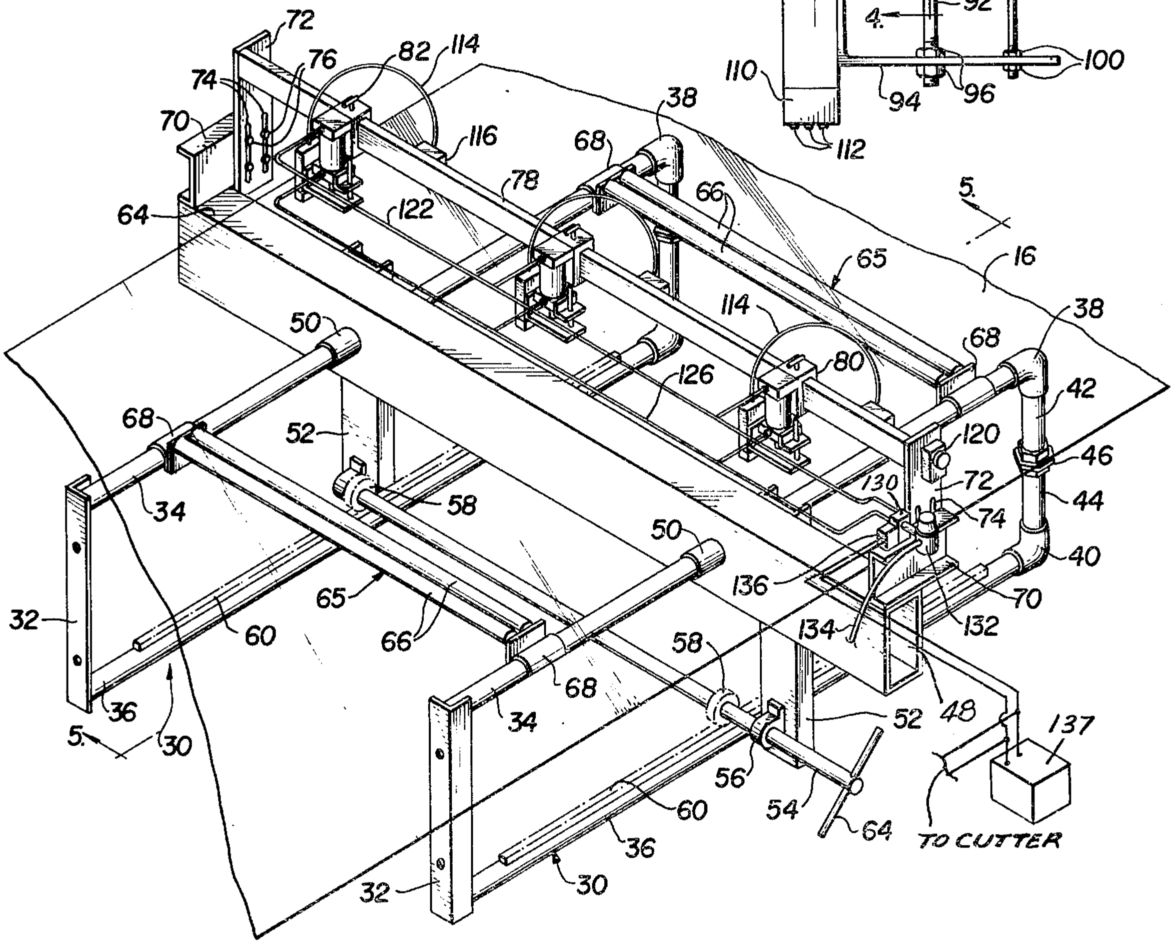
FIG. 2 is a perspective view of the stamping apparatus.

Referring now to the drawings in detail, FIG. 1 shows a portion of an extrusion line including the exit end of the extrusion apparatus 10 with the extrusion nozzle indicated schematically at 11, the movable hot knife cutter assembly 12 and the hot die marking apparatus 14 mounted on the cutting apparatus for movement therewith. The cutting apparatus and the hot die marking apparatus are shown schematically as being mounted on a track in longitudinal alignment with the exit end of the extrusion apparatus so that a continuous sheet 16 of plastic material fed from the extrusion apparatus by the pinch-type draw rolls 18 is fed directly into the cutter through the hot die marking apparatus. Suitable slitting knife means illustrated schematically by the fixed blade 19 is provided to trim and slit the extruded sheet to the desired width. A sheet 20 of protective material such as paper or the like is shown being laminated onto the bottom surface of the plastic sheet 16, from a roll 22, so that the bottom surface of the plastic sheet is protected against scratching or marring in the die marking and cutting apparatus, and during subsequent handling. A second roll of cover material 24 is shown positioned above the plastic sheet 16 for applying a protective laminate coat to the top side of the plastic material when desired.

The continuous plastic sheet 16 is substantially rigid and self-supporting when it exits from the nip of the draw rolls 18. This sheet conventionally passes unsupported from the draw rolls into the cutting apparatus, and the individual sheets cut therefrom are conveyed from the cutter by a suitable conveying mechanism such as the gravity conveyor 26.

To assure a uniform cut without marring or damaging the sheets of plastic, the cutter unit is reciprocated along the path of movement of the continuous sheet by suitable means such as the cylinder and piston assembly 27 to move with and at the same rate as the sheet during the actual cutting operation. After completion of the cutting operation, the cutter moves upstream (toward the extrusion apparatus), stops, and reverses its direction in preparation for the next cut. This movement of the cutter is conventional and therefore the means for accomplishing the movement, and the structure of the hot knife and its means of operation are not shown in detail.

The hot die marking apparatus 14 mounted on the cutter 12 includes a pair of substantially identical, laterally-spaced rectangular frame assemblies 30, each including a vertical angle member 32 adapted to be mounted onto the cutter unit by suitable fastener means such as bolts, not shown. The frame assemblies 30 include tubular top and bottom rail members 34, 36, respectively, each having one end rigidly joined, as by welding, to the angular member 32 and their opposite, or upstream, ends joined through elbows 38, 40, nipples 42, 44, and unions 46.

A support beam 48 is slidably mounted on the top rails 34 by a pair of tubular guide sleeves 50 extending through and rigidly welded to the support beam. A pair of drive brackets 52 are rigidly welded onto the support beam and project downwardly therefrom one outboard of each of the frame assemblies 30. A transversely-extending shaft is mounted on the brackets 52, as by journal blocks 56, and a pair of pinion gears 58 fixed on the shaft 54 mesh with gear racks 60 extending along the top surface of bottom rails 36. A T-handle 62 on the end of shaft 54 enables manual rotation of the shaft and pinion gears to drive the support beam 48 along the racks 60, with the sleeves 50 sliding on the upper rails 34 maintaining the support beam 48 accurately aligned transversely of the direction of movement of the continuous strip 16 through the apparatus.

The top surface 64 of the support beam 48 extends in a horizontal plane above the top rails 34 and spaced slightly below a horizontal plane extending through the nip of the draw rolls 18 at the exit end of the extrusion apparatus 10. This permits the plastic sheet 16 to sag slightly between the exit of the extrusion apparatus and the support rolls (not shown) in the cutting apparatus. In use of the apparatus, the surface 64 will normally touch and provide very light support for the bottom surface of the plastic sheet 16 passing thereover, thereby serving to locate the sheet vertically. Additional support is provided for the bottom surface of the moving plastic sheet by two movable auxiliary support roller assemblies 65, each consisting of a pair of identical rollers 66 supported by brackets 68 positioned on the top surface of top rails 34. The auxiliary roller support assemblies 65 can be manually positioned along the top rails at the desired location to assist in supporting the sheets and to maintain only a light contact pressure between the sheet and the top surface 64 of beam 48. The position of the auxiliary roller supports will, of course, depend to some extent upon the longitudinal position of the beam as adjusted by the rack-and-pinion positioning mechanism described above. Where the beam is positioned closely adjacent one end of the rack, it may be desirable to rearrange the auxiliary roller supports so that both are on the same side of the beam. Alternatively, only one support may be required.

A pair of identical rigid brackets 70 are mounted one on each end of the support beam 48 and project upwardly therefrom. A pair of support plates 72, each having elongated mounting slots 74 formed therein, are mounted on the brackets 70, as by bolts 76. A mounting bar 78 has its opposed ends mounted on the respective support plates 72. Mounting bar 78 extends parallel to the top surface 64 of support beam 48, with the mounting bar extending in slightly off-set vertical relation to the surface 64.

Figures 4, 5:
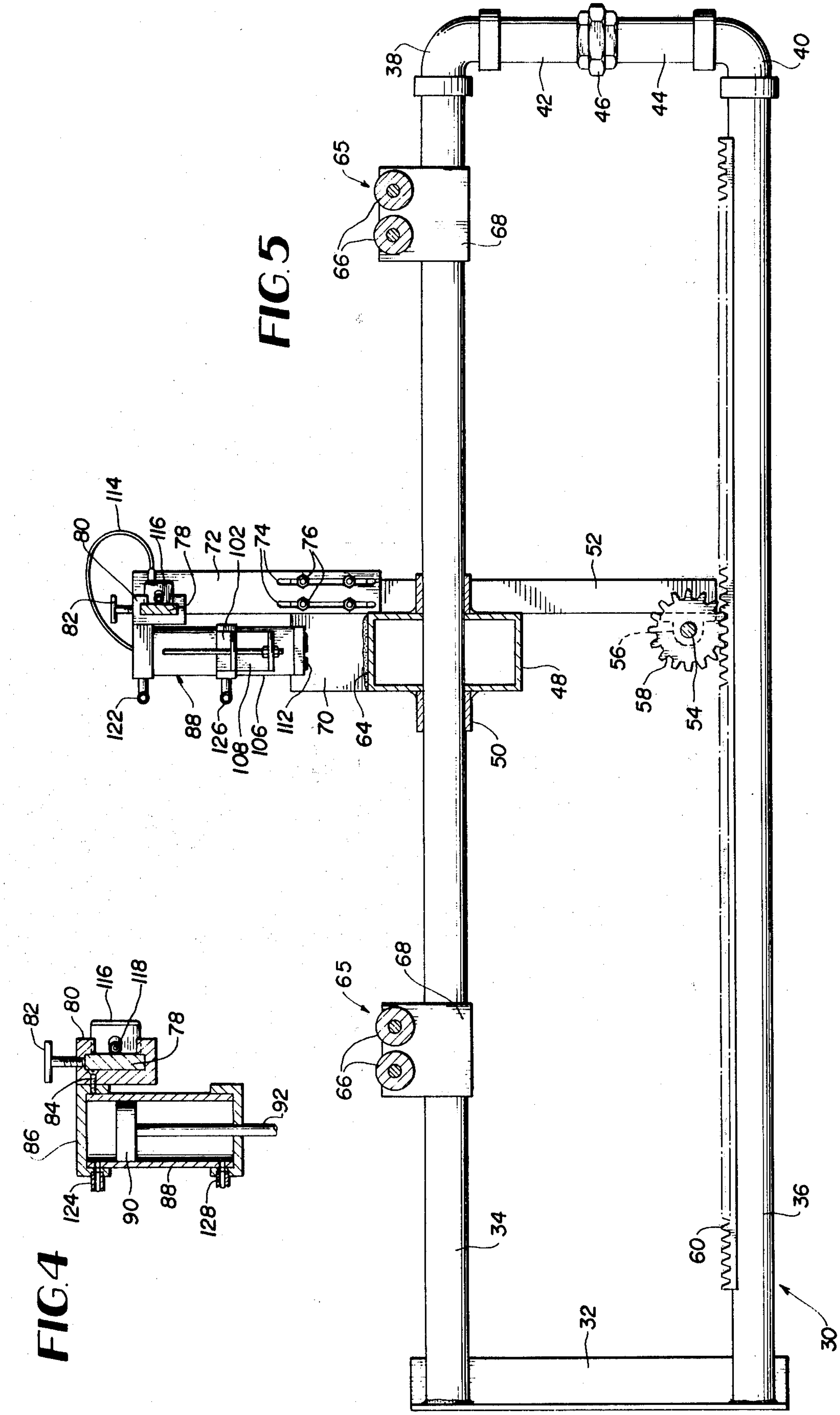
FIG. 4 is a sectional view taken on line 4—4 of FIG. 3.
FIG. 5 is a sectional view, on an enlarged scale, taken on line 5—5 of FIG. 2.

A plurality of C-shaped mounting clamps 80 are supported on mounting bar 78 and retained thereon by a manually operable set screw 82, as best seen in FIG. 4. Countersunk screws 84 extending through clamp 80 support the base block 86 of a reciprocal air motor, or cylinder assembly 88. Air motor 88 has a piston 90 slidably mounted therein, with the rod 92 projecting vertically downward toward the surface 64. An angle bracket 94 is mounted on the distal end of piston rod 92, by a pair of nuts 96 threaded onto the end of the rod. Adjustments of the nuts 96 provide for fine adjustment of the vertical position of the bracket 94.

A guide rod 98 is rigidly supported on bracket 94, as by nuts 100. Rod 98 extends upwardly through a guide bracket 102 supported on the head block 104 of cylinder assembly 88, to thereby retain bracket 94 against rotation about the vertical axis of the piston rod 92. A heater block and stamp holder 106 is mounted on a vertical arm 108 of bracket 94, and a die member 110, having raised indicia 112 on its bottom surface, is mounted on the heater block 106. Electrical current is supplied to heater block 106 through cord 114 plugged into electrical outlets 116 at spaced intervals along the length of the mounting bar 78. Electrical current is supplied to the outlets through conductors contained in a conduit 118 extending along the length of the mounting bar. A rheostat 120 mounted on one of the brackets 70 is connected in the electric supply circuit to control the temperature of the heating blocks 106 and consequently the dies 110. Rheostat 120 can be manually set to provide the desired temperature.

Die 110 is moved vertically into and out of contact with a plastic sheet passing above surface 64 by supplying air under pressure to the piston end of cylinder 88. Air supplied to the rod end of cylinder 88 moves the piston upward away from the plastic sheet. To control operation of the piston, air is supplied through a conduit 122 connected, through fittings 124 in the base 86 of the cylinder assembly 88 and through conduit 126 connected to fittings 128 in the respective head blocks 104 of the cylinder assemblies. Air conduits 122 and 126 are connected to a two-way, solenoid- actuated control valve 130 which, in turn, is connected, through a pressure regulator 132, to an air supply line 134. Valve 130 is actuated by a solenoid 136 connected in the electric circuit from control 137 for actuating the hot knife cutter assembly so that, when the cutter is actuated to cut off a sheet of plastic, solenoid 136 is simultaneously actuated to direct air under pressure to the piston end of the cylinder assemblies and to vent the rod end. At the completion of the cutting operation, when the hot knife is retracted, solenoid 136 is actuated to reverse valve 130, thereby venting the piston end and directing air under pressure to the rod end of the air cylinders to quickly raise the die 110 out of contact with the plastic.

Since the die marking apparatus is mounted on and therefore moves with the cutter assembly during the marking operation, and the cutter and marking units are moving with the sheet during this time, there is no relative movement between the die head and the plastic sheet, in the plane of the sheet, during the marking operation. The top surface 64 of support beam 48 lightly supporting the underside of the plastic sheet accurately positions the sheet in the vertical direction so that uniform penetration of the die characters is assured. Further, since the characters on the die head are heated, only extremely light pressure for a very short time is required to accurately and clearly, but lightly mark the surface of the plastic material.

By adjusting the position of the support beam 48, and consequently all of the die marking assemblies mounted on the transversely extending support rod, along the length of the top support arms 34, the markings applied to the surface of the continuous sheet can be accurately located relative to the next succeeding cutting line transversely of the plastic sheet. Preferably, this arrangement is such that the die marking is applied closely adjacent to the cut line so that, after cutting, the markings will appear closely adjacent the edge of the individual sheets. Since the die marker is actuated each time the cutter is actuated, a mark is applied to the continuous sheet, at a predetermined distance from the cutter, each time the cutter is actuated.

In an alternate embodiment of the invention, the auxiliary roller support assemblies 65, including the support roller 66, position the bottom surface of the plastic sheet slightly above the surface 64. The strength of the plastic sheet is more than sufficient to adequately mark the surface; however, the position of the roller 66, the ambient temperature, and other factors affecting the sag of the sheet must be more accurately controlled to thereby accurately control the depth of penetration of the heated die elements. This embodiment, however, may be particularly desirable in marking sheets which do not employ the laminated protective cover on the bottom surface of the sheet whereby the surface would be more susceptible to scratching or marring if permitted to slide over the surface 64. In the embodiment where the plastic does lightly slide over surface 64, an anti-friction coating such as Teflon, or the like, may be provided to the top of the beam.

From the above, it is seen that the die marking apparatus according to this invention accurately marks the plastic sheet during production and before cutting. This eliminates the additional handling step conventionally employed to mark individual sheets. Further, the accurate controls of the apparatus provide a more uniform and more accurately located marking than has heretofore generally been achieved.

While I have disclosed and described preferred embodiments of my invention, I wish it understood that I do not intend to be restricted solely thereto, but rather that I intend to include all embodiments thereof which would be apparent to one skilled in the art and which come within the spirit and scope of my invention.

I claim:

1. In an apparatus for producing plastic sheets of predetermined size from a thermoplastic material by use of a forming apparatus to initially heat and form the thermoplastic material into a continuous sheet of the desired thickness, conveying the continuous sheet from the forming apparatus and permitting the plastic material to cool and harden, slitting the continuous sheet to the desired width as it moves from the forming apparatus, and cutting the cooled hardened continuous sheet into predetermined lengths by passing it through a cutter which is reciprocably moved along a path parallel to the direction of movement of the sheet, the movement of the sheet and the reciprocal movement of the cutter being coordinated so that the cutter is moving in the same direction and at the same rate as the sheet during the cutting operation, the improvement comprising a hot die marking apparatus, means mounting the hot die marker on one side of the continuous sheet between the cutter and the forming apparatus, means reciprocably moving the hot die marker with the cutter along said path, the hot die marker including (a) a die for contacting and marking the surface of the continuous sheet, (b) heater means for heating the die, and (c) power means for moving the die toward and away from the continuous sheet to move the die into and out of contact with the surface of the sheet, and control means responsive to operation of the cutter and controlling operation of said power means to move the die into contact with the sheet substantially simultaneously with the cutting of the individual sheets and for moving the die away from the sheet at the conclusion of the cutting operation.

2. The apparatus as defined in claim 1, wherein said means mounting the hot die marker comprises frame means rigidly mounted on the cutter for movement therewith.

3. The apparatus as defined in claim 2, further comprising adjusting means on said frame for adjusting the position of said die marker relative to the cutter to thereby adjust the distance from the cutter to the point of contact of the die with the plastic sheet.

4. The apparatus as defined in claim 3, wherein said frame comprises a pair of parallel rails extending in spaced relation to one another and parallel to the direction of movement of the sheet through the apparatus, a support beam slidably mounted on said rails, said support beam mounting said hot die marker above said continuous sheet, and rack-and-pinion means for adjusting the position of said support beam longitudinally of said rails.

5. The apparatus as defined in claim 4, further comprising movable sheet support roller means mounted on said rails for contacting the bottom surface of the continuous sheet.

6. The apparatus as defined in claim 5, wherein said support beam has a top surface parallel to the bottom surface of the continuous sheet and positioned to contact said bottom surface to provide vertical support thereto.

7. The apparatus as defined in claim 6, wherein said top surface of said support beam is positioned vertically below the die.

8. The apparatus as defined in claim 2, further comprising sheet support means extending transversely of the direction of movement of the continuous sheet and beneath the hot die marker, said sheet support means contacting the surface of the sheet on the side thereof opposite the hot die for supporting the sheet in fixed position relative to the hot die marker while the hot die is in contact with the sheet.

9. The invention as defined in claim 8, wherein said sheet support surface is supported for movement with said cutter and said hot die to thereby eliminate relative movement between the support surface and the continuous sheet while the hot die is in contact with the continuous sheet.

* * * * *